(12) United States Patent
Percival et al.

(10) Patent No.: US 6,226,652 B1
(45) Date of Patent: *May 1, 2001

(54) METHOD AND SYSTEM FOR AUTOMATICALLY DETECTING COLLISION AND SELECTING UPDATED VERSIONS OF A SET OF FILES

(75) Inventors: Lynn Cleveland Percival; John Lane Scanlon, both of Raleigh, NC (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,910

(22) Filed: Sep. 5, 1997

(51) Int. Cl.[7] .................................................. G06F 17/30
(52) U.S. Cl. .......................... 707/203; 707/204; 707/511; 717/11; 345/334; 345/340
(58) Field of Search .......................... 707/1–10, 100–106, 707/200–206, 500, 511, 526; 345/333–340, 348, 343, 302, 252; 717/11

(56) References Cited

U.S. PATENT DOCUMENTS

| | | | |
|---|---|---|---|
| 5,481,722 | * | 1/1996 | Skinner .............................. 395/700 |
| 5,555,409 | * | 9/1996 | Leenstra, Sr. et al. .............. 707/101 |
| 5,598,208 | * | 1/1997 | McClintock ......................... 348/158 |
| 5,671,428 | * | 9/1997 | Muranaga et al. ................... 345/329 |
| 5,737,740 | * | 4/1998 | Henderson et al. ................. 707/530 |
| 5,765,176 | * | 6/1998 | Bloomberg .......................... 707/514 |
| 5,787,280 | * | 7/1998 | Joseph et al. ....................... 395/619 |
| 5,799,315 | * | 8/1998 | Rainey et al. ....................... 707/104 |
| 5,806,078 | * | 9/1998 | Hug et al. ............................ 707/511 |
| 5,845,293 | * | 12/1998 | Veghte et al. ....................... 707/202 |

OTHER PUBLICATIONS

Koike, H et al., VRCS:integrating version control and module management using interactive three–dimensional graphics, visual languages, Sep. 1997, proceedings, IEEE, and 168–173.*

* cited by examiner

Primary Examiner—John Breene
Assistant Examiner—Srirama Channavajjala
(74) Attorney, Agent, or Firm—A. Bruce Clay; Myers, Bigel, Sibley & Sajovec, PA

(57) ABSTRACT

A list of various versions of file sets that need to be reconciled (collisions) are automatically loaded into a collision handler. The user works through the list, resolving differences by selecting one of the files or by merging several of them through selection and modification, as required. The user is provided with buttons that allow rapid changes between different styles of views (Split, Composite, Split-Merge, Composite-Merge) which allows the user to see the files in a number of different ways to further facilitate the process.

18 Claims, 12 Drawing Sheets

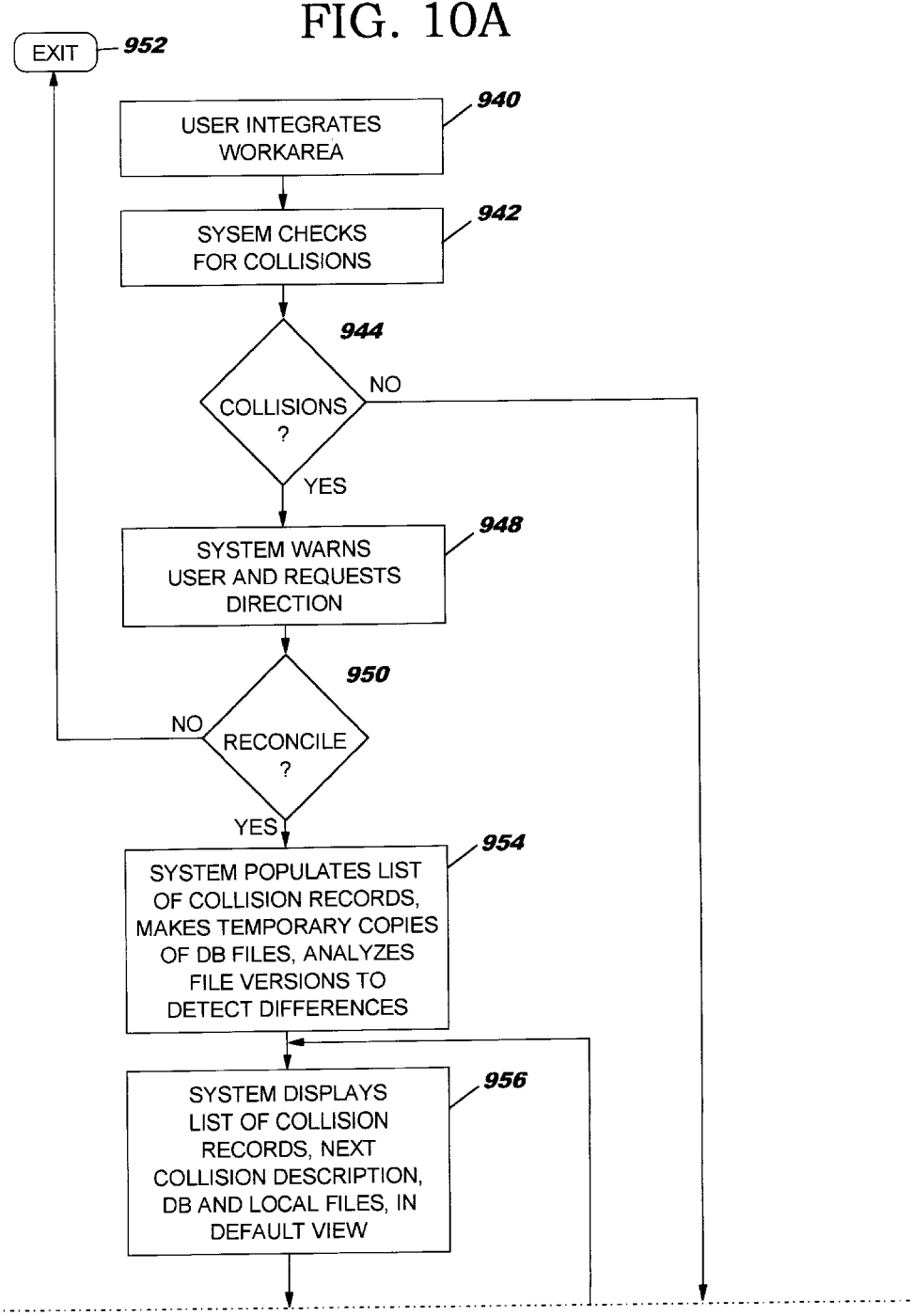

METHOD AND SYSTEM FOR AUTOMATICALLY DETECTING COLLISION AND SELECTING UPDATED VERSIONS OF A SET OF FILES

FIELD OF THE INVENTION

This invention relates in general to computer software, and in particular to a method and system for automatically notifying a user that a file has been changed/updated by several different persons at the same time in order to allow the various versions to be reconciled.

BACKGROUND OF THE INVENTION

In a programming environment, programmers may check out a file to write new programming, to change/update and/or debug. With the use of library type storage systems, this may be done by several different programmers simultaneously. Thus, if each person makes one or more changes, the others may not know what has been done. When the files are returned to the library from the various programmers, there will be no single correct and updated version.

Currently there are tools that allow a user to merge one set of changed files at a time, however, the user is required to determine how many sets there are and work through them keeping track of changes manually. Obviously, this is time consuming and prone to error. Other tools may automatically determine all the relevant sets of files that need to be updated, but the user must still work through these sets manually.

Thus, there is a need for a method and system for automatically selecting updated versions of a file and resolving conflicts therein.

SUMMARY OF THE INVENTION

The present invention relates to a method and system for merging a plurality of varying versions of a set of computer files which greatly reduces problems associated with the prior art. The present invention allows a user to visually select the proper version of any collision without the need to manually keep track of where a change may be needed.

In accordance with one embodiment of the present invention, a plurality of various versions of a computer file are merged. Each of the plurality of various versions are automatically loaded into a collision handler. The various versions are then displayed to the user with the collision handler. The user may then resolve any differences between the various versions by visually selecting a preferred one of the versions.

The versions may be displayed to the user in any of a plurality of views in accordance with the users preference. The views are: split, composite, split-merge and composite-merge.

The solution as provided herein takes a list of file sets that have to be reconciled (collisions) and loads them into the collision handler. Then the user works through the list, resolving the differences by selecting one of the files or by merging several of them through selection and modification, as required. The user is provided with buttons that allow them to rapidly change between views (Split, Composite, Split-Merge, Composite-Merge). This allows the user to see the files in a number of different ways to further facilitate the process.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
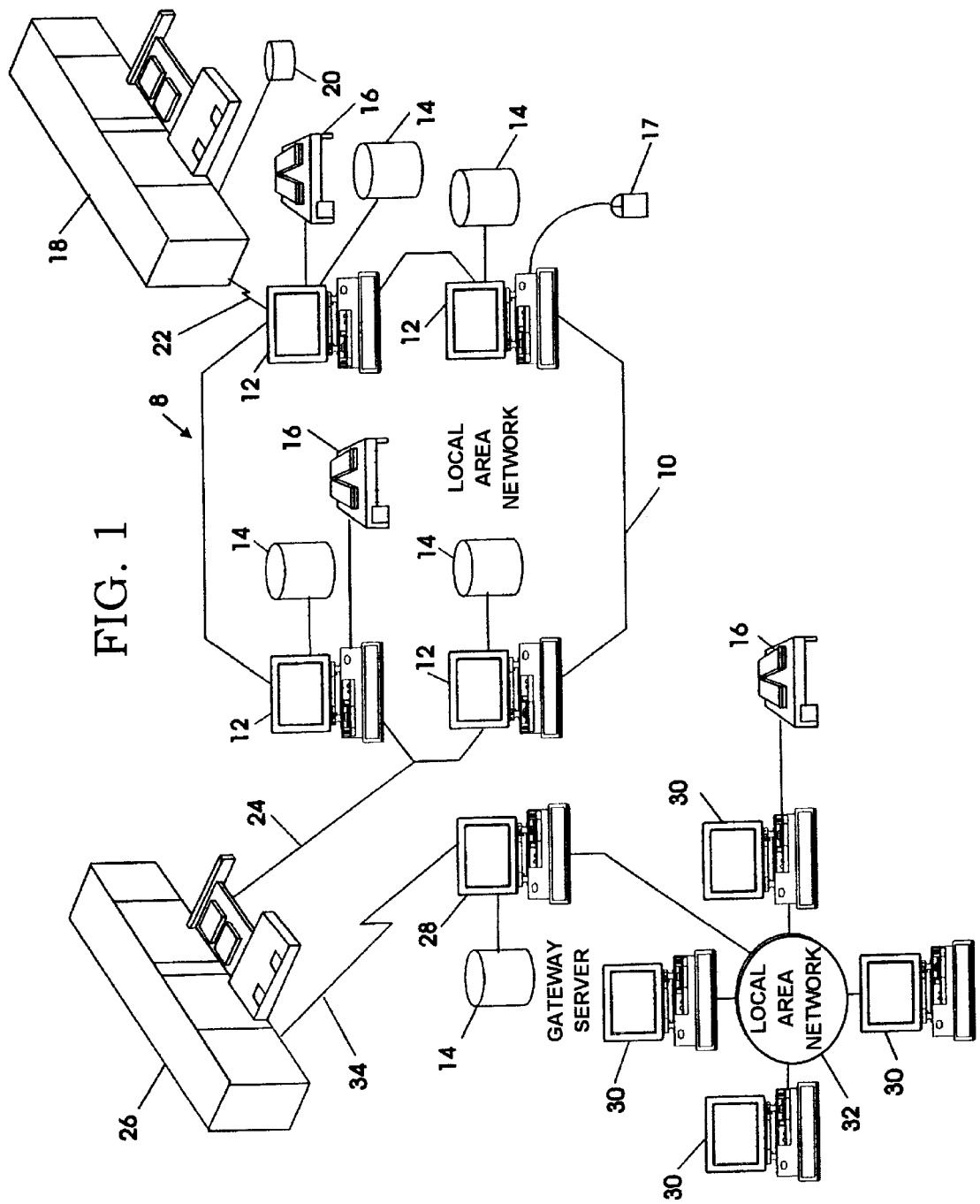
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
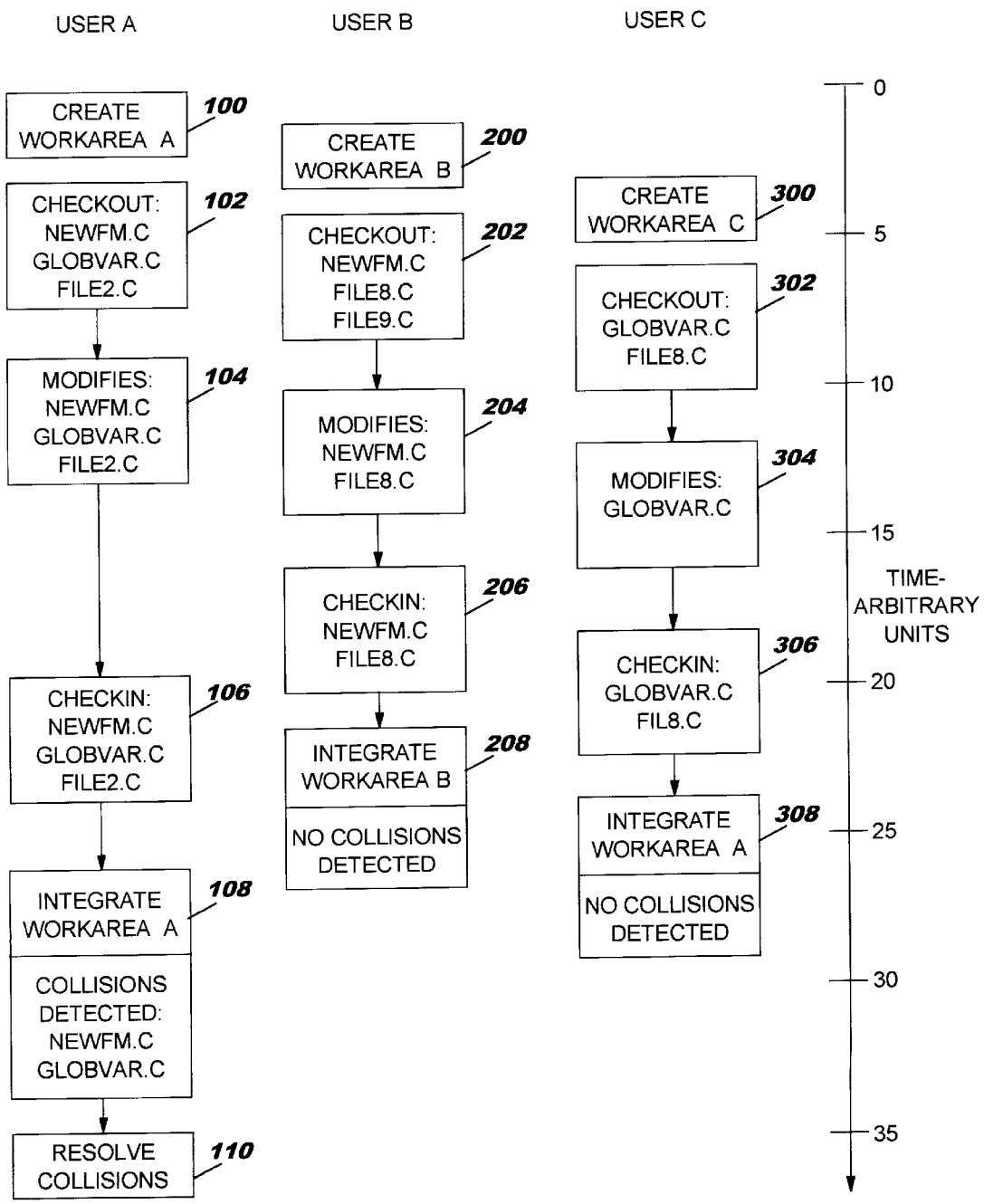
FIG. 2 shows one scenario whereby several users modify a file in parallel in accordance with the present invention.

To illustrate the present invention, a case of three developers (User A, User B, and User C) working concurrently along a time line with a common pool of files will be used as shown in FIG. 2). After creating a Workarea for each user in blocks 100, 200 and 300, respectively, Users A, B and C have each checked out files in blocks 102, 202, and 302, respectively. One of the files, "Newfm.c," has been checked out by both User A and User B. Further, "Newfm.c" has been modified by both Users A and B at blocks 104 and 204, respectively. User B checks the file "Newfm.c" back in first at block 206, so no collision is detected at block 208. However, when User A attempts to check file "Newfm.c" in at block 106, the version in the database, which now contains User B's changes, conflicts with User A's version, and a collision is detected at block 108.

Similarly, Users A and C both have checked out and modified "Globvar.c" in blocks 102, 104 and 302, 304, respectively. Again, since User C checks "Globvar.c" back in first at block 306, no collision is detected at block 308. When User A attempts to check "Globvar.c" in at block 106, a collision results at block 108. User A now must deal with two collisions at block 110.

In contrast, "file8.c," which has been checked out by both Users B and C, has been modified only by User B. User C checks it back in at block 306 without having made any changes and, being first back in, creates no collision at block 308. When User B checks "file8.c" back in with changes at block 206, no collision is detected at block 208 since User C had not modified the file.

Following is a description of how User A would deal with the two collisions, first with a prior art collision handling procedure; next with a prior art external file merge tool; and finally with the present invention, referred to herein as the Multiple Collision Handler (MCH). It is to be understood that dealing with only two collisions is an extremely simple example and is used only to illustrate the concepts. In a large-scale development effort, with numerous developers and files, multiple collisions may result when a developer attempts to check in a large set of files. In a preferred embodiment, various colors would be used to designate the various versions being reconciled. However, due to drawing constraints, greyed out areas will be identified by cross-hatching, a first version will be identified by slashing, and a second version will be identified by reverse slashing.

In the first example using a prior art collision handling procedure, once collisions have been detected, User A is provided with a message that collisions have occurred. The user must navigate a menubar (i.e., "Parts"→"Collision records . . . ") to display a dialog with a list of collision records, select a collision record, and either specify which version of the file to use or specify that the files are to be merged. If "Merge" is specified, a window appears with both files displayed and their differences are highlighted. (Note: Even if the user does not intend to actually merge the files, the merge option is the only way to compare the files to determine which one to actually check in. He would then renavigate the menubar to reselect that collision and specify which file to use.) To merge the files, User A must mark blocks or lines of code to be excluded from the target (i.e., the file which will be checked into the database), and then saves and checks in the resulting file. To deal with the second collision, User A must start all over again, once again navigating the menubar ("Parts"→"Collision records . . . "), selecting another collision record from the list, etc. This process must be repeated for each of the detected collisions, i.e., for each file pair with differences. Thus, this prior art procedure is too slow.

With a prior art external tool, User A would have been notified that collisions exist, and would still have to navigate a menubar to display the list of collisions. To compare the files creating a collision, the user would then invoke the external tool, open the local file (i.e., the file he/she is attempting to check in), locate the database version, and open that version within the external tool. At this point, User A can decide to use one of the two versions without merging and by returning to the list of collisions, he/she can select which version to use. To merge the files, the user must select which version of each highlighted difference to use for the target. This merged file can then be saved as the new local file, and when User A attempts to check it in, another collision will occur. This time, the user would navigate to the collision list again, select the new collision, and select the newly merged version as the file to use. (Note: The original collision would first have had to be cleared from the list; this could be accomplished by selecting the original collision and selecting the database version. However, this must be done before checking in the merged version.) Again, this method is too slow and is also too complex.

Figure 3:
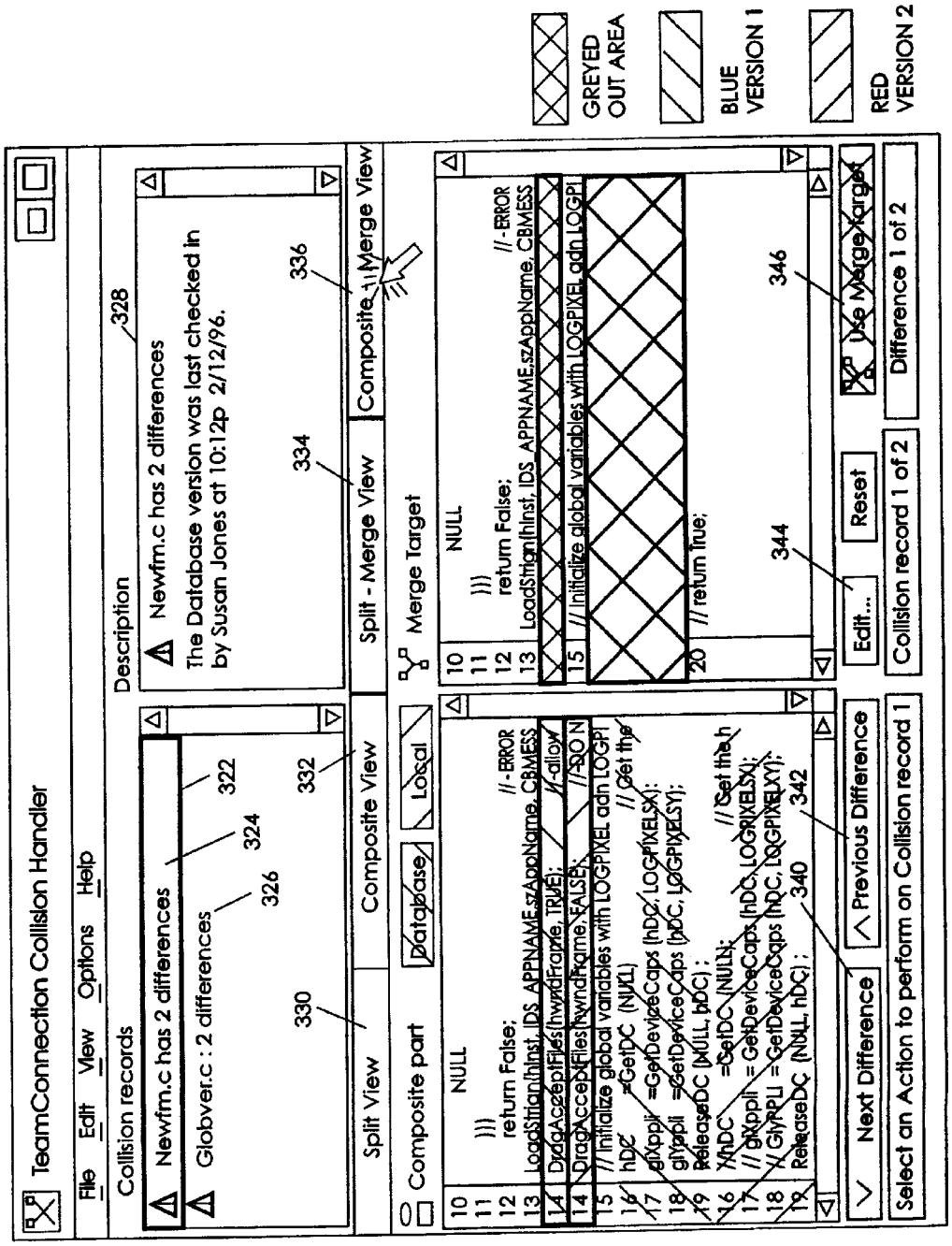
FIG. 3 illustrates a collision handler in a composite-merge view in accordance with the present invention.

The Multiple Collision Handler (MCH) in accordance with the present invention avoids all of the repeated menubar navigation, and all of the explicit file manipulation found in the prior art methods. When collisions are detected, MCH is automatically invoked. FIG. 3 shows the Multiple Collision Handler, generally identified by reference numeral 320, in an initial state. In an upper left hand pane 322, Collision Records generated by a work area integration are listed. In this case there are collisions on file "Newfm.c," identified by reference numeral 324 and on file "Globvar.c," identified by reference numeral 326. The first collision (file 324) is selected by default. In an upper right hand pane 328, information is listed relating to the first collision, e.g., the number of differences, who the part was last checked in by and when.

Buttons below the upper pane control the views that the user may utilize to resolve the conflicts. Split View button 330 will display a side-by-side view of the different part versions; Composite View button 332 will display an interleaved view; Split-Merge View button 334 will display an over-under view of the part versions beside the Merge work product or target; and Composite-Merge View button 336 will display an interleaved view of the parts beside the Merge Target. A Composite-Merge view is shown as selected in FIG. 3.

A "Next Difference" button 340 and a "Previous Difference" button 342 allow the user to move through the detected differences in the part versions. An "Edit" button 344 allows the user to edit a selected line in the Merge Target, and a "Use Merge target" button 346 becomes active when all differences have been resolved.

Figure 4:
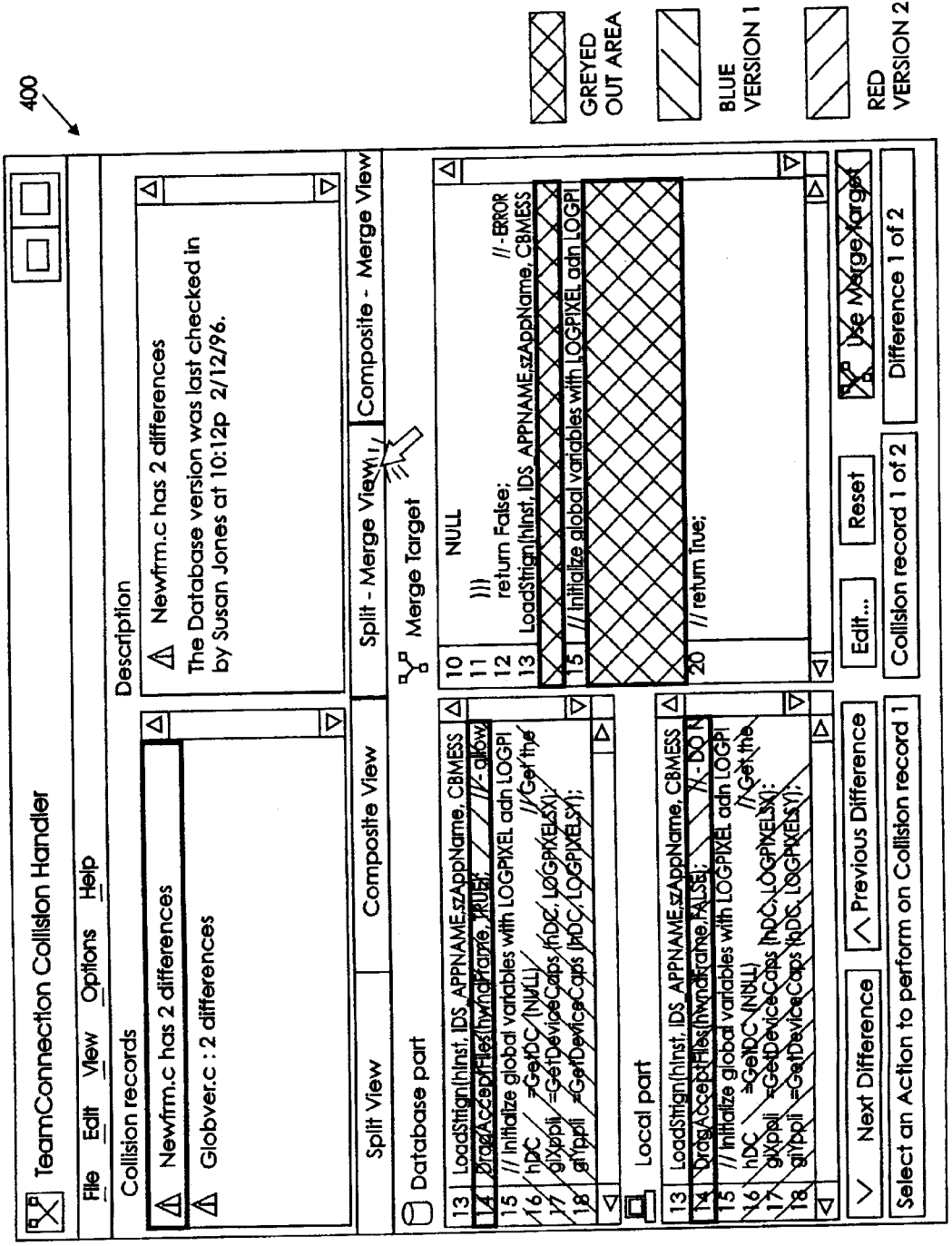
FIG. 4 illustrates a collision handler in a split-merge view in accordance with the present invention.
Figure 5:
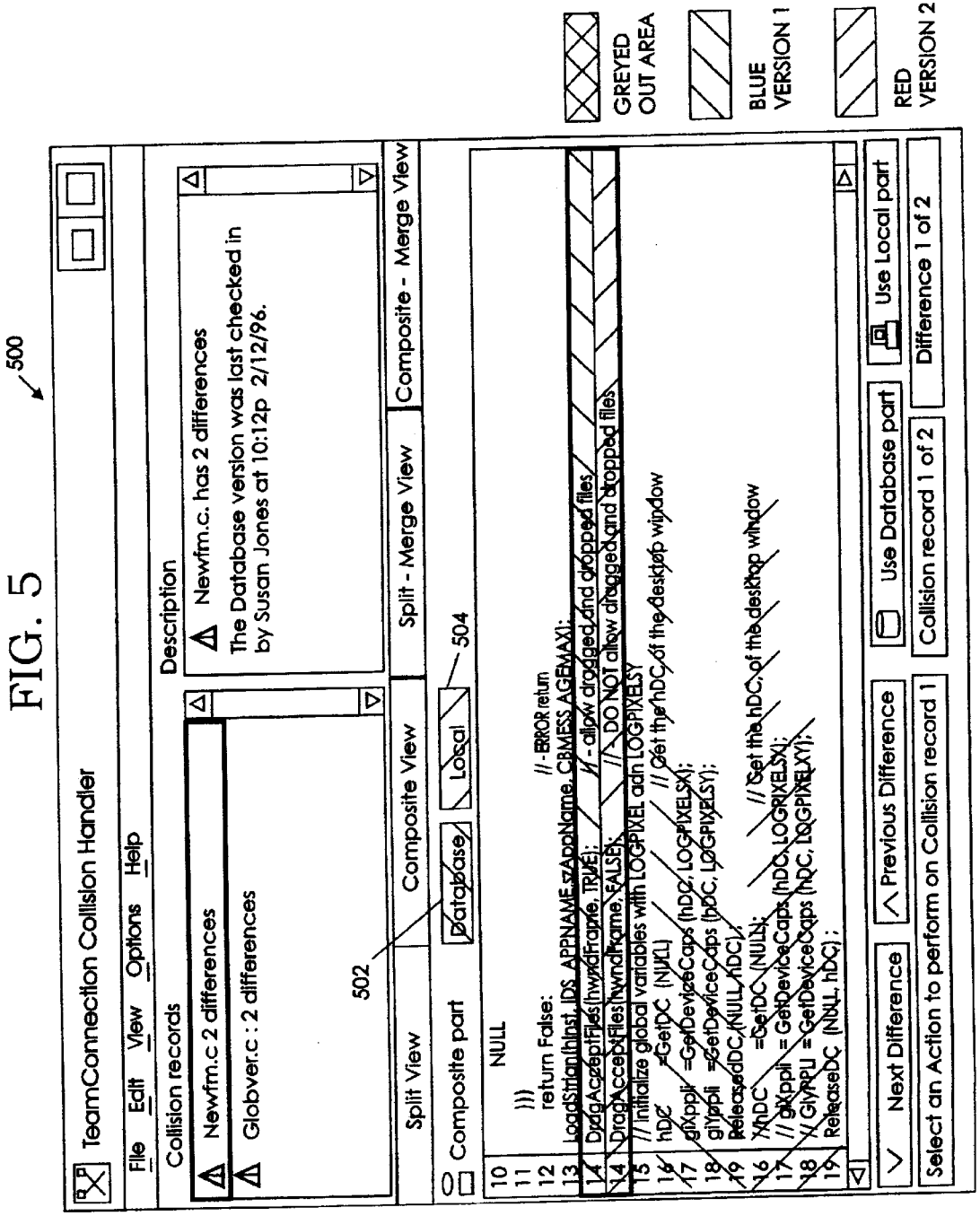
FIG. 5 illustrates a collision handler in a composite view in accordance with the present invention.
Figure 6:
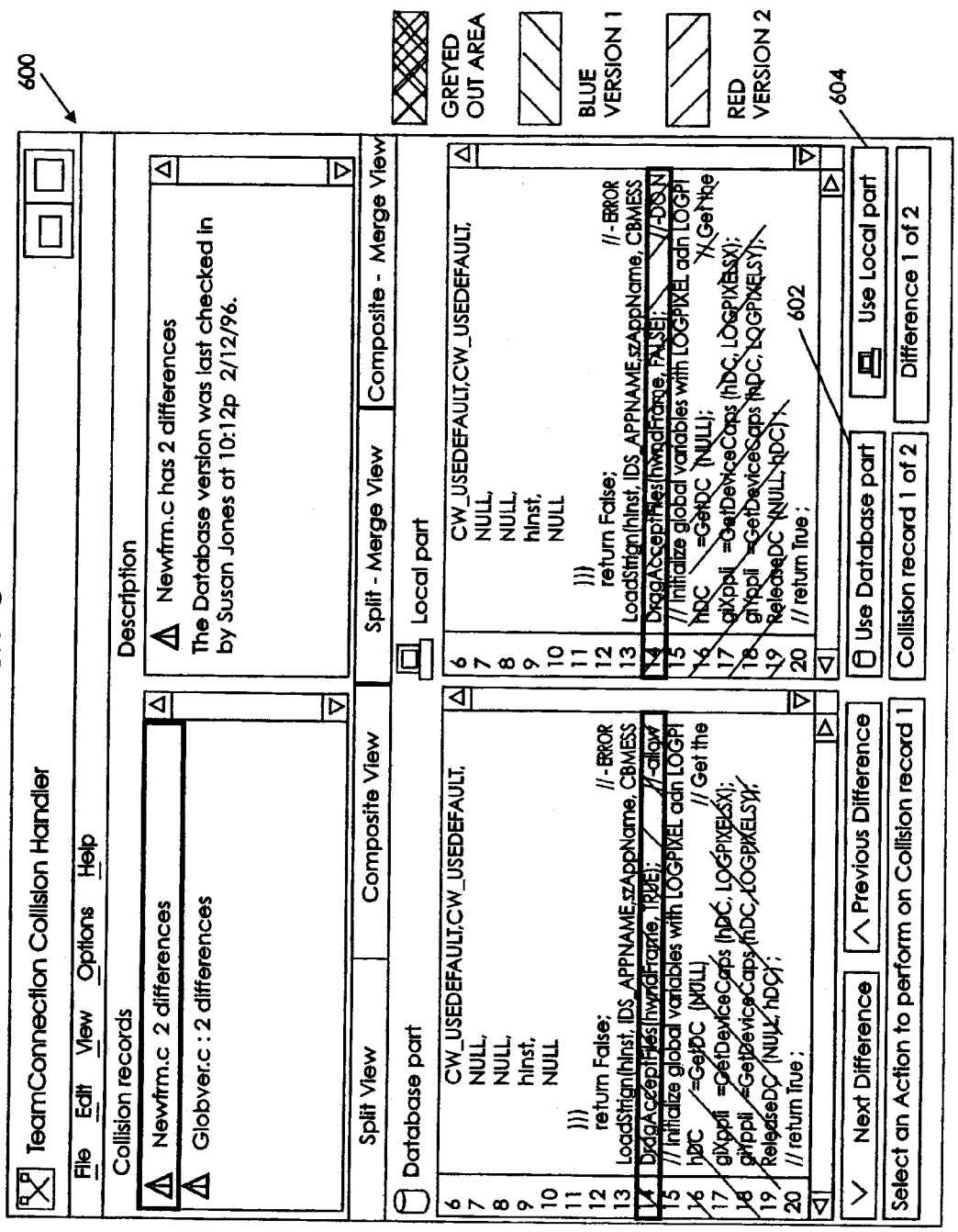
FIG. 6 illustrates a collision handler in a split view in accordance with the present invention.

FIG. 4 shows a Split-Merge View, generally indicated by reference numeral 400. The two part/file versions are shown in an over-under view with the Merge Target beside them. FIG. 5 shows a Composite View, generally identified by reference numeral 500, in which part versions are shown interleaved without a Merge Target. Buttons 502 and 504 allow the user to select one of the versions (Database or Local). FIG. 6 shows a Split View, generally indicated by reference numeral 600, with the versions shown side-by-side and buttons 602 and 604 available to select a version.

Figure 7:
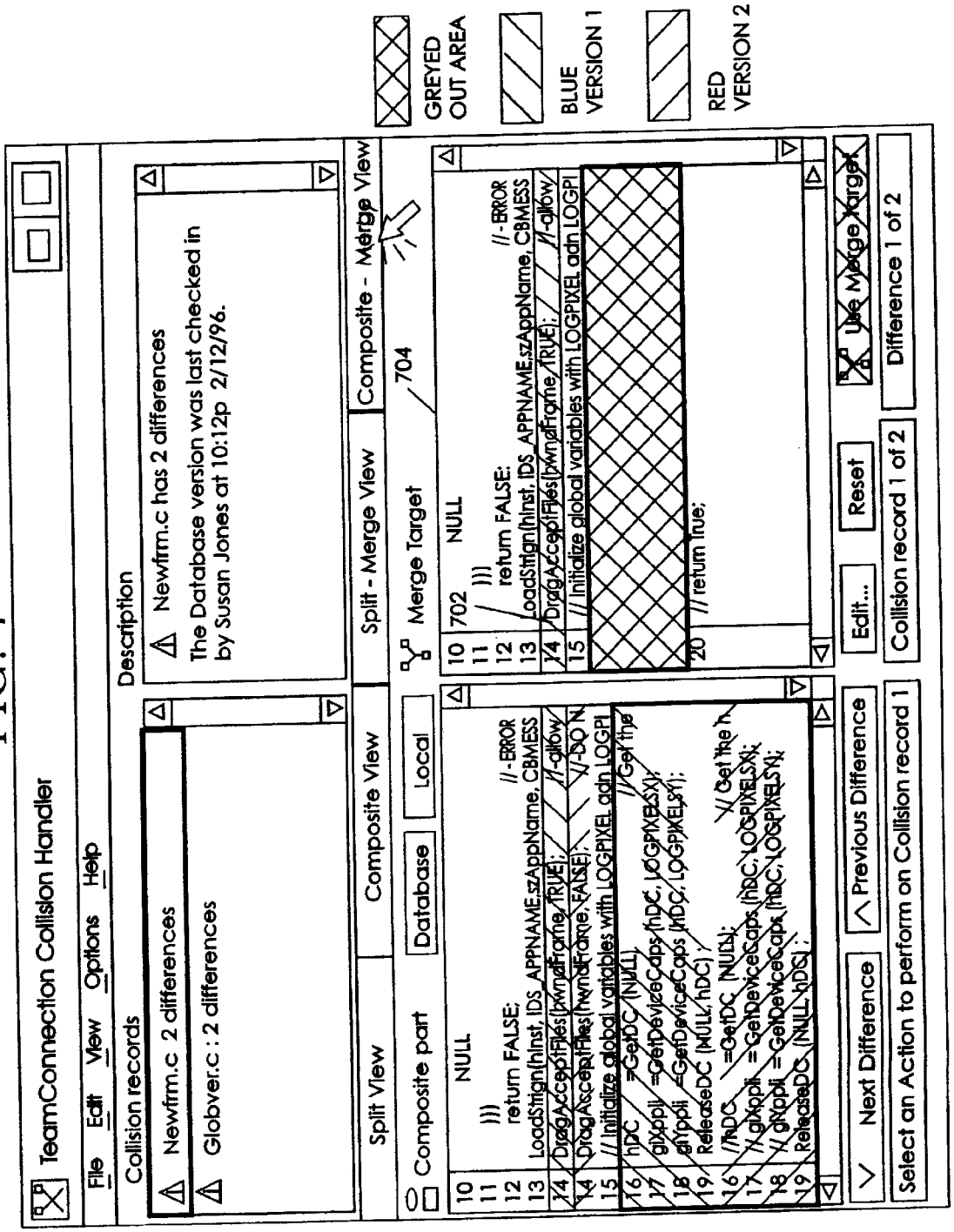
FIG. 7 illustrates a collision handler with direct insertion of material into a merge target in accordance with the present invention.
Figure 8:
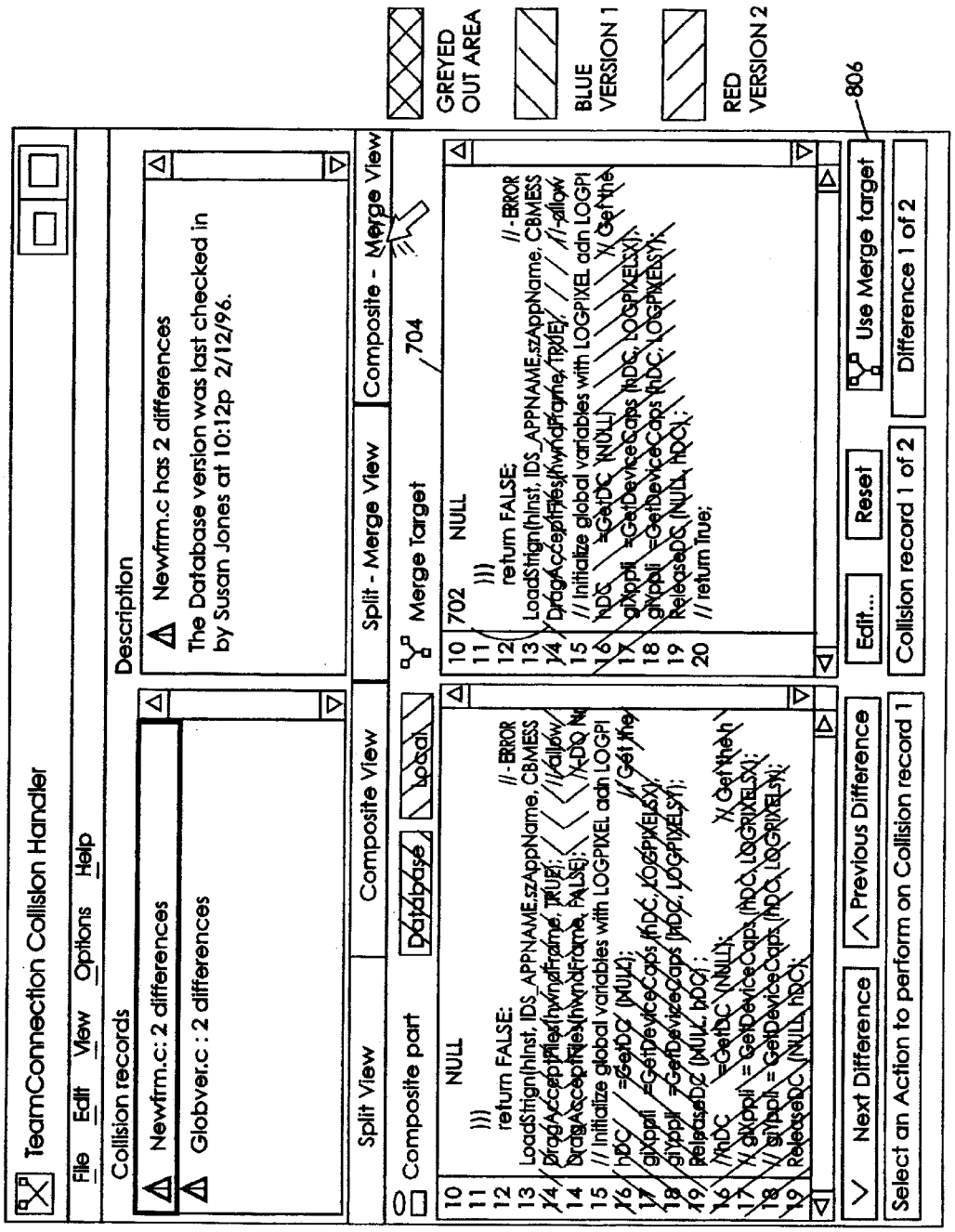
FIG. 8 illustrates a collision handler showing all differences resolved in accordance with the present invention.
Figure 9:
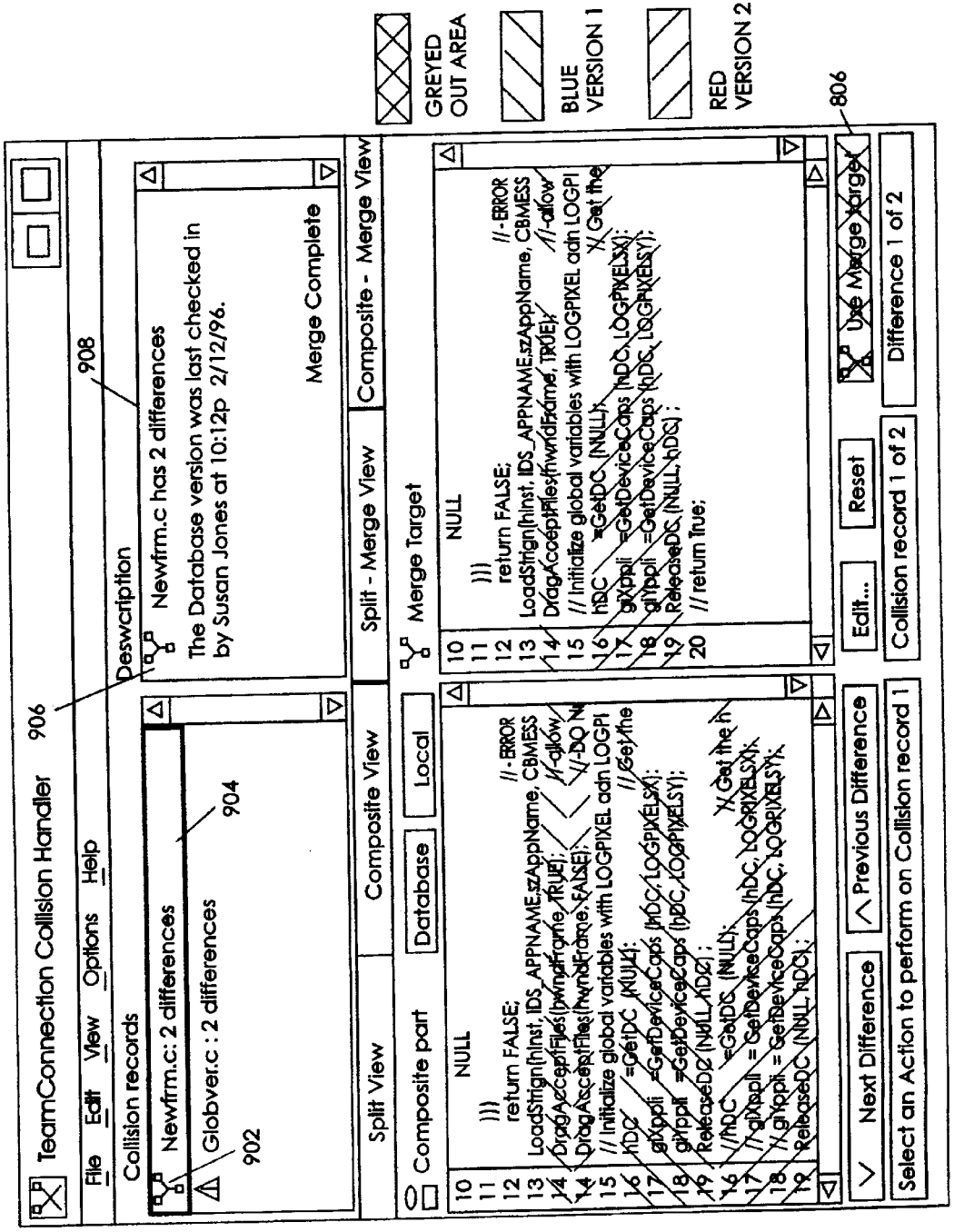
FIG. 9 illustrates a collision handler showing selection of merged target for resolving collision in accordance with the present invention.

FIG. 7 again shows a Composite-Merge View, generally identified by reference numeral 700, with an item 702 (line 14) already added to the Merge-Target 704. After the user selects the desired version to resolve the difference, the Merge Target is automatically filled-in and the view is advanced to the next difference. The source is a specific color (shown as hatching in the instant example) which is carried to the target. Continuing the example of FIG. 7, FIG. 8 shows that all differences have been resolved, the origin of the items in the Merge Target 704, and the activation of a button 806 to select the Merge Target to resolve the collision. Additionally, FIG. 9 shows the condition after the user has selected the Use Merge Target button 806. An icon 902 in the Collision records pane 904 and an icon 906 in the Description pane 908 have changed to show that the Merge Target will be used to resolve that collision. The user is then ready to work on the next collision.

Figure 10B:
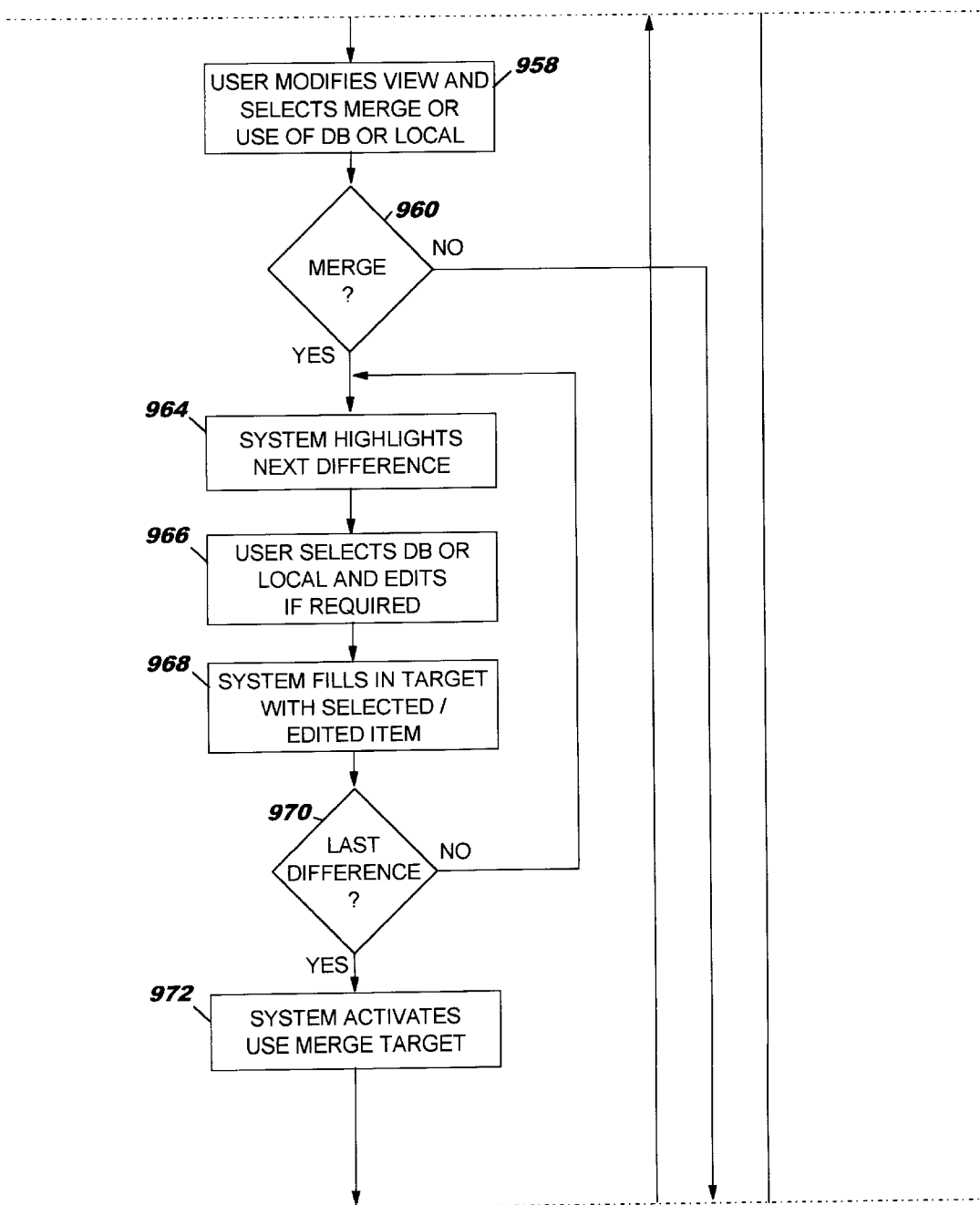
FIG. 10 illustrates a high level flowchart of the present invention.
Figure 10C:
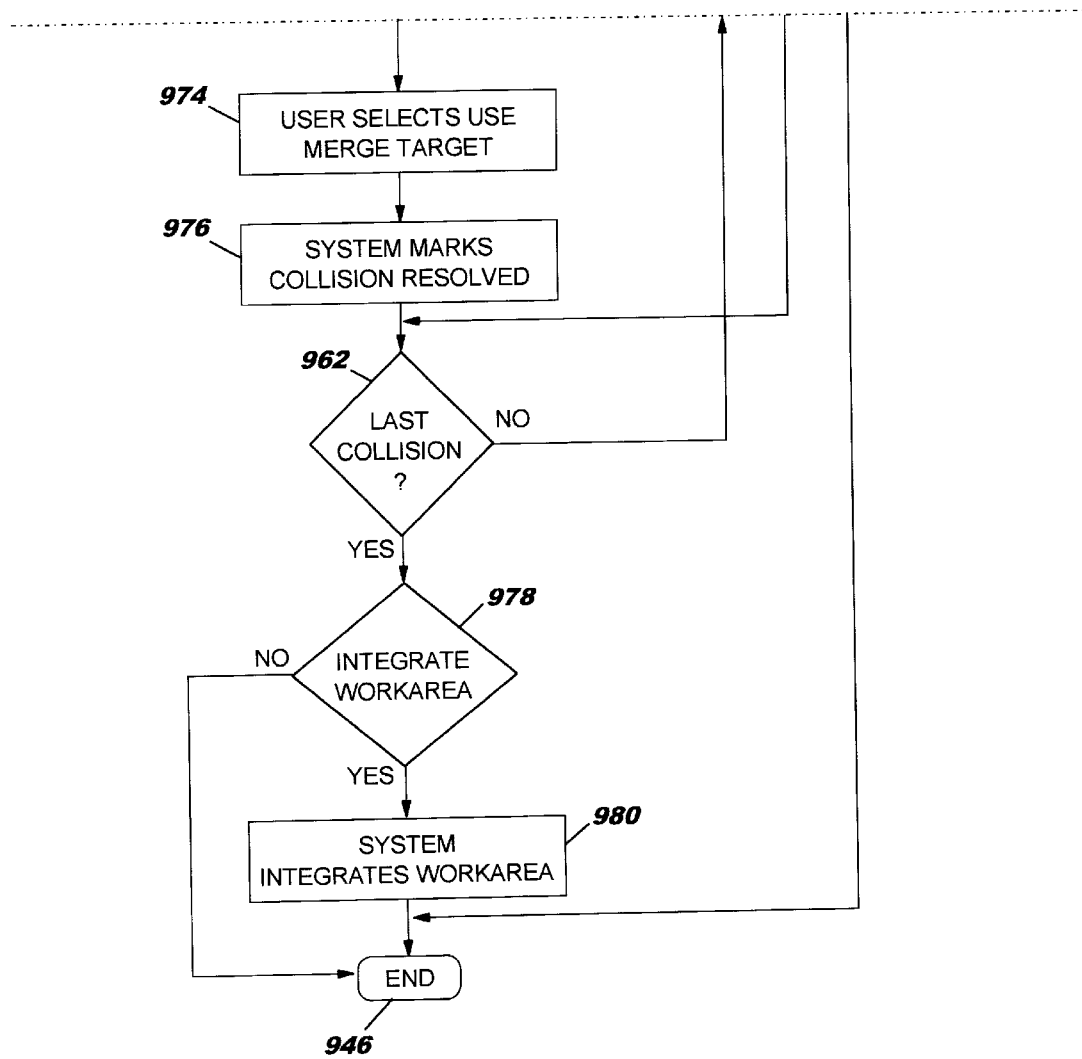

The flowchart in FIG. 10 provides an overview of the flow of the present invention. The present invention starts at block 940 when the user attempts to integrate a Workarea where changes have been made. The system then checks for collisions at block 942, and it is determined at decision block 944 whether or not a collision is detected. If the response to decision block 944 is no, the present invention ends at 946. If the response to decision block 944 is yes, (collisions are detected) the system warns the user and requests direction from the user at block 948.

It is then determined at decision block 950 whether or not the user wants to reconcile the differences. If the response to decision block 950 is no, the present invention exits at 952. If the response to decision block 950 is yes, (the user decides to reconcile the collisions) the system populates the list of collision records, makes temporary copies of the files, and analyzes the files for differences at block 954. At block 956 the lists are displayed in the default view. The user modifies the view as needed to decide whether to use the database or local version as-is, or merge the two versions at block 958.

It is then determined at decision block 960 whether or not the user has decided to merge the versions. If the response to decision block 960 is no (the user selected use Local or DataBase version), the collision record is marked as being resolved and the icon changed to show the origin of the version as appropriate, and the present invention proceeds to decision block 962, as will be subsequently described in greater detail.

If the response to decision block 960 is yes (the user is merging the versions), the system highlights the differences and places selection emphasis on the next one at block 964. The user selects the DataBase or Local version of that difference at block 966, and the system places it into the Merge Target, preserving the color to show the origin at block 968. The user may then edit the line, if desired, by selecting the Edit button. It is then determined at decision block 970 whether or not this was the last difference to be resolved. If the response to decision block 970 is no, the present invention returns to block 964, as previously described above.

If the response to decision block 970 is yes, the system activates the Use Merge Target button at block 972. When the user selects the Use Merge Target button at block 974, the collision record is marked as being resolved at block 976, and the icon is changed to indicate that the resolution was through a merge. Subsequent to block 976 or decision block 960, it is determined at decision block 962 whether or not this is the last collision. If the response to decision block 962 is no, the present invention returns to block 956, as previously described above. If the response to decision block 962 is yes, it is determined at decision block 978 wether or not to integrate the Workarea. If the response to decision block 978 is no, the present invention ends at 946. If the response to decision block 978 is yes, the system integrates the Workarea into the code base at block 980 and ends at 946.

As a result of the present invention, the problem of merging several sets of files in a programming environment is solved. Prior to the present invention, available tools would only allow the user to merge one set of files at a time. The user was required to determine how many sets there were and to work through them, keeping track manually. This was time consuming and error prone.

The solution as provided herein is to take a list of file sets that have to be reconciled (collisions) and load them into the collision handler. Then the user works through the list, resolving the differences by selecting one of the files or by merging several of them through selection and modification, as required. The user is provided with buttons that allow them to rapidly change between views (Split, Composite, Split-Merge, Composite-Merge). This allows the user to see the files in a number of different ways to further facilitate the process.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of merging a plurality of various versions of a set of computer files, comprising the steps of:

detecting a collision between the data contained in computer files in the plurality of various versions of the set of computer files;

automatically loading each of the plurality of various versions of the set of computer files for which a collision was detected into a collision handler, without user intervention and in response to the detection of a collision between computer files in the plurality of various versions of the set of computer files;

displaying data from said versions for which a collision was detected with said collision handler so as to highlight the differences between the data of said versions by concurrently displaying the data of the plurality of versions of a set of computer files;

resolving a first difference between said versions by accepting a graphical selection of a preferred one of said displayed data from said versions; then automatically displaying a next difference after the first difference is resolved so as to allow the user to graphically select a preferred one of the displayed data from the versions corresponding to the next difference; and storing a version of the loaded computer files having the differences resolved as selected by the user.

2. A method according to claim 1, further comprising the steps of:

providing a plurality of view options to a user of the collision handler so as to allow the user to select the view option with which to concurrently display data from at least two of the loaded computer files associated with the detected collisions between the computer files loaded in the collision handler;

obtaining user input to select the view option from the plurality of view options; and wherein the step of displaying comprises the step of displaying data from said versions for which a collision was detected with said collision handler utilizing the selected view option so as to highlight the differences between the data of said versions by concurrently displaying the data of the plurality of versions of a set of computer files.

3. The method of claim 2, wherein the plurality of view options includes a composite view, said step of displaying further comprises:

displaying data from said versions in a composite view if the obtained user input selects the composite view view.

4. The method of claim 2, wherein the plurality of view options includes a split-merge view, said step of displaying further comprises:

displaying data from said versions in a split-merge view if the obtained user input selects the split-merge view.

5. The method of claim 2, wherein the plurality of view options includes a composite-merge view, said step of displaying further comprises:

displaying data from said versions in a composite-merge view if the obtained user input selects the composite-merge view.

6. The method of claim 2, wherein the plurality of view options includes a split view, said step of displaying further comprises:

displaying data from said versions in a composite view if the obtained user input selects the split view.

7. A system for merging a plurality of various versions of a set of computer files, comprising:

means for detecting a collision between the data contained in computer files in the plurality of various versions of the set of computer files;

means for automatically loading each of the plurality of various versions of the set of computer files for which a collision was detected into a collision handler, without user intervention and in response to the detection of a collision between computer files in the plurality of various versions of the set of computer files;

means for displaying data from said versions for which a collision was detected with said collision handler so as to highlight the differences between the data of said versions by concurrently displaying the data of the plurality of versions of a set of computer files;

means for resolving a first difference between said versions by accepting a graphical selection of a preferred one of said displayed data from said versions; then means for automatically displaying a next difference after the first difference is resolved so as to allow the user to graphically select a preferred one of the displayed data from the versions corresponding to the next difference; and means for storing a version of the loaded computer files having the differences resolved as selected by the user.

8. A system according to claim 7, further comprising:

means for providing a plurality of view options to a user of the collision handler so as to allow the user to select the view option with which to concurrently display data from at least two of the loaded computer files associated with the detected collisions between the computer files loaded in the collision handler;

means for obtaining user input to select the view option from the plurality of view options; and wherein the means for displaying comprises means for displaying data from said versions for which a collision was detected with said collision handler utilizing the selected view option so as to highlight the differences between the data of said versions by concurrently displaying the data of the plurality of versions of a set of computer files.

9. The system of claim 8, wherein the plurality of view options includes a split-merge view said means for displaying further comprises:

means for displaying said versions in a split-merge view if the obtained user input selects the split-merge view.

10. The system of claim 8, wherein the plurality of view options includes a composite-merge view, said means for displaying further comprises:

means for displaying said versions in a composite-merge view if the obtained user input selects the composite-merge view.

11. The system of claim 8, wherein the plurality of view options includes a composite view said means for displaying further comprises:

means for displaying said versions in a composite view if the obtained user input selects the composite view.

12. The system of claim 8, wherein the plurality of view options includes a split view, said means for displaying further comprises:

means for displaying said versions in a split view if obtained user input selects the split view.

13. A computer program product recorded on computer readable medium for merging a plurality of various versions of a set of computer files, comprising:

computer readable means for detecting a collision between the data contained in computer files in the plurality of various versions of the set of computer files;

computer readable means for automatically loading each of the plurality of various versions of the set of computer files for which a collision was detected into a collision handler, without user intervention and in response to the detection of a collision between computer files in the plurality of various versions of the set of computer files;

computer readable means for displaying data from said versions for which a collision was detected with said collision handler so as to highlight the differences between the data of said versions by concurrently displaying the data of the plurality of versions of a set of computer files;

computer readable means for resolving a first difference between said versions by accepting a graphical selection of a preferred one of said displayed data from said versions; then computer readable means for automatically displaying a next difference after the first difference is resolved so as to allow the user to graphically select a preferred one of the displayed data from the versions corresponding to the next difference; and computer readable means for storing a version of the loaded computer files having the differences resolved as selected by the user.

14. A computer program product according to claim 13, further comprising:

computer readable means for providing a plurality of view options to a user of the collision handler so as to allow the user to select the view option with which to concurrently display data from at least two of the loaded computer files associated with the detected collisions between the computer files loaded in the collision handler;

computer readable means for obtaining user input to select the view option from the plurality of view options; and wherein the computer readable means for displaying comprises computer readable means for displaying data from said versions for which a collision was detected with said collision handler utilizing the selected view option so as to highlight the differences between the data of said versions by concurrently displaying the data of the plurality of versions of a set of computer files.

15. The program product of claim 14, wherein the plurality of view options includes a composite-merge view, said computer readable means for displaying further comprises:

computer readable means for displaying said versions in a composite-merge view if the user input selects the composite-merge view.

16. The program product of claim 14, wherein the plurality of view options includes a split-merge view, said computer readable means for displaying further comprises:

computer readable means for displaying said versions in a split-merge view if the user input selects the split-merge view.

17. The program product of claim 14, wherein the plurality of view options includes a composite view, said computer readable means for displaying further comprises:

computer readable means for displaying said versions in a composite view if the user input selects the composite view.

18. The program product of claim 14, wherein the plurality of view options includes a split view, said computer readable means for displaying further comprises:

computer readable means for displaying said versions in a split view if the user input selects the split view.

* * * * *